March 23, 1926.
F. FOLEY
1,577,571
TILTING SHADE DIMMED HEADLIGHT
Filed Feb. 3, 1925
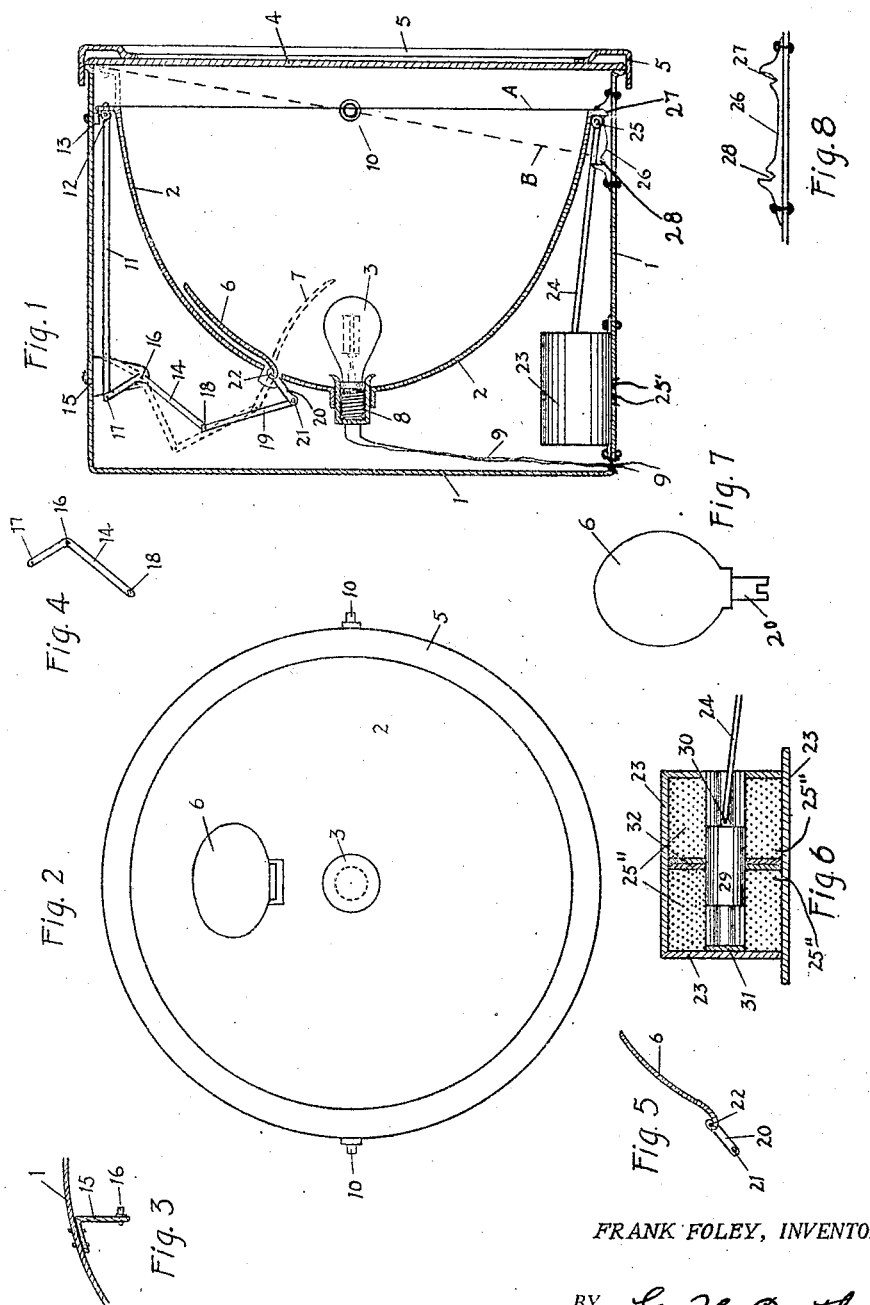
FRANK FOLEY, INVENTOR.
BY G. H. Duthie
ATTORNEY.

Patented Mar. 23, 1926.

1,577,571

UNITED STATES PATENT OFFICE.

FRANK FOLEY, OF CLARKSBURG, WEST VIRGINIA.

TILTING SHADE-DIMMED HEADLIGHT.

Application filed February 3, 1925. Serial No. 6,555.

*To all whom it may concern:*

Be it known that I, FRANK FOLEY, a citizen of the United States, residing in Clarksburg, in the county of Harrison and State of West Virginia, have invented certain new and useful Improvements in a Tilting Shade-Dimmed Headlight, of which the following is a full specification.

This invention relates to new and useful improvements in automobile shade-dimmed headlights.

The main object of this invention is the construction of an automobile headlight equipped with a pivotally suspended reflector, adapted to tilt forward at the upper portion and tilt backward at the lower portion of said reflector, having an automatically tilting lamp shade, pivotally attached within the reflector, which lamp shade is automatically lowered to cover the upper half of the lamp bulb, when the upper portion of the reflector tilts forward, and electric magnet means for tilting the reflector; and by means of novel connections, the said shade is lowered and raised to its respective positions. A further object is the construction of a shade-dimmed headlight equipped with a pivotally attached reflector,—(a very short movement of the electric magnet will reproduce a double tilting movement of the reflector) and inexpensive connections for automatically raising and lowering the inner lamp shade,—and otherwise made commercially desirable.

With the foregoing and other objects in view, as will more fully appear as the description proceeds, it will be observed that my new improvements relate to my U. S. headlight Patent, No. 1,521,219, issued December 30, 1924.

It will be observed further that my improvements consist of a headlight of standard dimensions, the interior combination and mechanical movements of which will hereinafter be fully described, illustrated and claimed; it being further understood that several changes may be made in the proportions and construction of the headlight devices without departing from the spirit and intent thereof.

I attain these objects by means of novel construction and mechanism illustrated in the accompanying drawings, in which:—

Figure 1 represents a vertical section of a barrel-shaped headlight, showing the general and tilted position of the pivotally mounted reflector, together with the raised lamp shade and operating devices, all within the headlight case.

Figure 2 represents a vertical plan view, or front, of the concave reflector showing the lamp-dimming shade 6, pivotally attached within the reflector, a short distance above the lamp socket.

Figure 3 represents a small portion of the upper part of the headlight case, showing a carrier bracket, suspended therefrom.

Figure 4 represents an obtuse-angled connection, removed from the headlight case.

Figure 5 represents an edge view of the lamp-dimming shade, removed from the reflector.

Figure 6 represents an enlarged, longitudinal section of the electric magnet, removed from the headlight case.

Figure 7 represents the plan view of the lamp-dimming shade, removed from the reflector.

Figure 8 represents a double-notched spring latch, removed from the headlight.

Referring to the drawings, similar numerals and letters refer to similar parts throughout the several views.

Numeral 1 designates the barrel-shaped headlight case; numeral 2 designates the reflector; 3 the electric lamp; 4 the headlight lens; 5 the ring flange which binds the lens to the headlight case; 6 the pivotally attached lamp shade; 7 the position of said lamp shade, when the reflector is in the tilted position, as indicated by the lines A—B. 8 the lamp socket; 9 the electric wires for lamp connection; 10 designates pivoting members, upon which the reflector tilts from the vertical to the tilted position; 11 a lamp shade connecting rod; 12 pin connection to the upper portion of the reflector flange; 13 a stop, against which the reflector flange rests, when in the vertical position; 14 an obtuse-angled member connection pivotally attached to the bracket 15, by means of pivot pin 16; 17 pin connection, connecting rod 11 to the upper portion of the obtuse angle; 18 pin connection between rod 19 and the lower end of the obtuse angle; 20 the lever connection, attached to the lower portion of the lamp shade; 21 pin connection between rod 19 and lever 20; 22 a pivot pin connecting the lamp shade to the reflector; 23 an electric magnet; 24 rod connection between the magnet and the lower portion of the reflector flange; 25 pin, connecting rod 24 to the reflector flange; 25' wire connections to the magnet; 26 a spring latch having notches 27 and 28, adapted to engage and latch the reflector flange, when in the vertical or tilted position; 29 magnet piston; 30 pin, connecting rod 24 to piston 29; 25" designates the coiled, wire magnets; 31 the insulator washer; 32 a partition between the wire magnet coils. All of said wire connections convey electric current, operated by switches.

It will be observed that my headlight case is of the barrel type. The reflector is pivotally attached within and to each side of the lamp case, by means of pivot members 10; and by means of the electric magnet, connected to the lower flange of the reflector, a half-inch movement of the magnet piston will produce the equal of a one-inch tilted position of the reflector,—the reflector being equipped with the usual electric light bulb.

It will be observed further that my lamp shade is pivotally attached to the reflector, through an opening, a suitable distance above the electric lamp; and, by means of the three-part, novel connections between the lever of the lamp shade and the upper portion of the reflector flange, the said lamp shade is automatically raised and lowered to its desired position, by means of tilting the reflector.

It will be observed still further that, by means of the electric magnet and the connections, the reflector 2 is tilted upon its pivot members, from the vertical position, within the lamp case, to the tilted position, as described by the dotted lines B; and it is to be understood that the reflector, the lamp shade and all the parts and connections to the said reflector, change their positions in like proportion to the tilting of the reflector (see Figure 1); the electric magnet and lamp are connected by wire means, to the automobile battery and operated by switch conveniently located for the operator.

In the operation of my headlight, as described in the foregoing, it will be readily understood that, by means of tilting the reflector and automatically lowering the lamp shade over the upper half of the electric lamp, the upward glare of the lamps is perfectly shaded and removed from persons who may be approaching; and the entire lighting capacity of the lamps is turned downward, more fully lighting up the road, immediately in front of the automobile, equipped with my improved lamps.

Having fully described my improved automobile headlights, what I claim as new and desire to secure by Letters Patent is:—

A headlight, comprising a case, a tilting reflector, having a pivotally attached lamp shade within said reflector and means for tilting said reflector; an obtuse-angled member, pivotally suspended by bracket means, from the upper portion of the headlight case; a horizontal connecting rod pivotally attached at one end to the upper angle of the obtuse-angled member, the other end of said rod adapted to pivotally engage the upper flange portion of the reflector; a vertical connecting rod the upper end of which is pivotally attached to the lower angle of the obtuse-angled member, the lower end of said rod adapted to pivotally engage the lever connection of the lamp shade; and by means of said connections and the tilting of the reflector, the said lamp shade is automatically raised and lowered as shown and described.

In testimony whereof I affix my signature.

FRANK FOLEY.